United States Patent [19]
Garakani

[11] Patent Number: 4,807,965
[45] Date of Patent: Feb. 28, 1989

[54] APPARATUS FOR THREE-DIMENSIONAL VIEWING

[76] Inventor: Reza G. Garakani, 6025 145 Pl. SE., Bellevue, Wash. 98006

[21] Appl. No.: 54,458

[22] Filed: May 26, 1987

[51] Int. Cl.⁴ ............................................. G02B 27/22
[52] U.S. Cl. ...................... 350/131; 350/132
[58] Field of Search .................. 350/130, 131, 132

[56] References Cited

U.S. PATENT DOCUMENTS

| | | | |
|---|---|---|---|
| 2,639,653 | 5/1953 | Fischer | 350/131 |
| 2,974,562 | 3/1961 | Rosenbloom | 350/131 |
| 3,101,644 | 8/1963 | Lopez-Henriquez | 350/131 |
| 3,334,179 | 8/1967 | Winnek | 350/131 |
| 3,439,972 | 4/1969 | Ratliff, Jr. | 350/131 |
| 3,495,891 | 2/1970 | Lee | 350/131 |
| 3,731,606 | 5/1973 | Geoffray | 350/132 X |
| 4,281,341 | 7/1981 | Byatt | 350/132 X |
| 4,469,414 | 9/1984 | Radl | 350/131 |

FOREIGN PATENT DOCUMENTS

| | | | |
|---|---|---|---|
| 58-184928 | 10/1983 | Japan | 350/132 |
| 60-37520 | 2/1985 | Japan | |
| WO-1035 | 11/1979 | PCT Int'l Appl. | 350/132 |

*Primary Examiner*—John K. Corbin
*Assistant Examiner*—Scott J. Sugarman
*Attorney, Agent, or Firm*—Townsend & Townsend

[57] ABSTRACT

A system for presenting stereoscopic images to a viewer includes a screen for presenting first and second images and a plurality of louvers for isolating the images for viewers located back from the screen along predetermined sight lines. In a first embodiment, a pair of stereoscopic images are presented simultaneously on co-planar screens, and fixed isolation louvers isolate the images for a viewer positioned along a center line from the viewing enclosure. In a second embodiment, the stereoscopic images are presented sequentially on a common screen, and movable louvers are provided for isolating the images first from the right eye and then from the left eye. In both cases, viewers may experience three-dimensional images without having to wear glasses or goggles and without having to come up immediately to the viewing device.

6 Claims, 2 Drawing Sheets

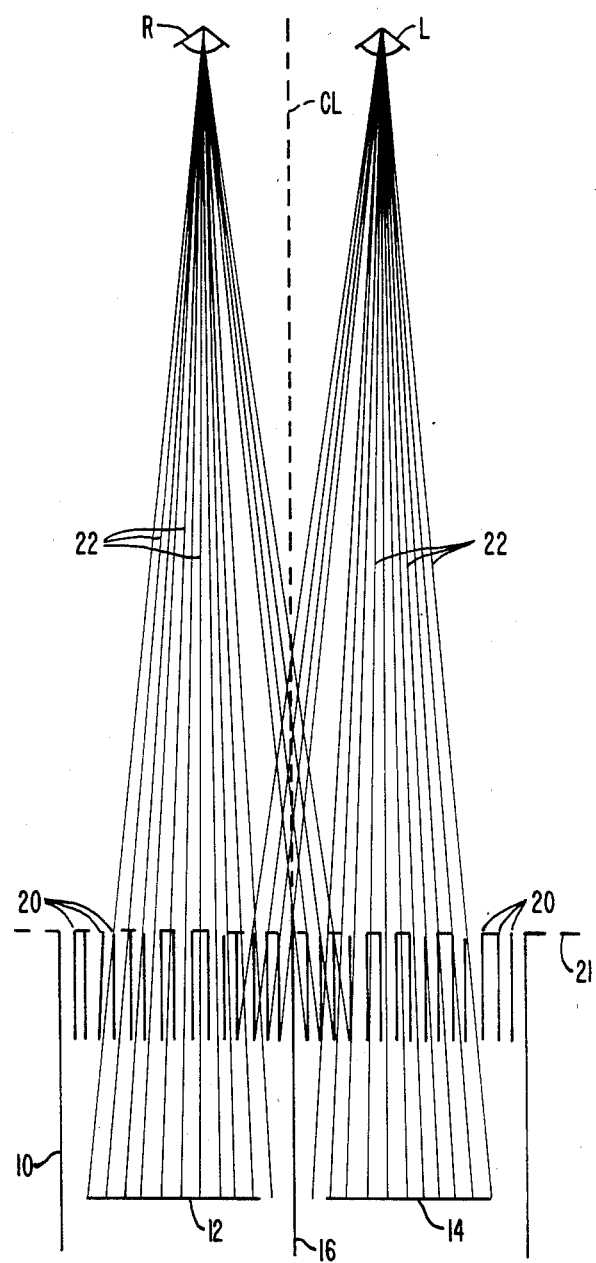
FIG._1.

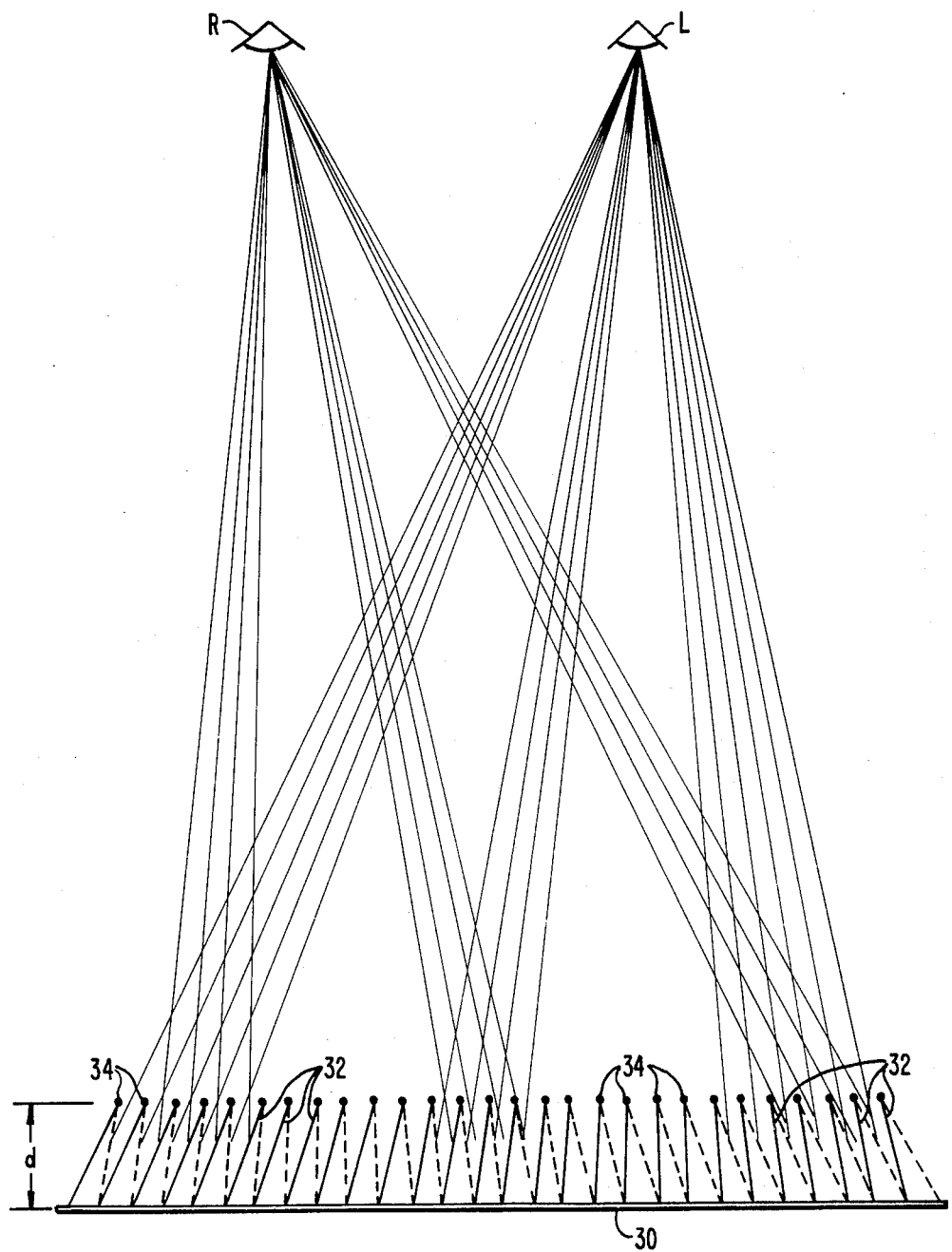
FIG._2.

APPARATUS FOR THREE-DIMENSIONAL VIEWING

BACKGROUND OF THE INVENTION

1. Field of the Invention

The present invention relates generally to devices for presenting three-dimensional images to viewers. More particularly, the invention relates to a device having fixed or movable louvers capable of isolating right and left stereoscopic images for one or more viewers located within a generally fixed area spaced-away from the viewing device.

Three-dimensional or stereoscopic viewing relies on the presentation to the viewer of a pair of images of the same scene or object, where the images differ only in parallax corresponding to the distance between the viewer's eyes. Usually, the images are taken by a stereoscopic camera having a pair of lenses spaced-apart by a distance approximately equal to that between a pair of eyes. A number of devices have been developed for viewing such pairs of images in order to enhance the apparent three-dimensionality.

Perhaps the best known of such devices are handheld stereoscopic viewers (stereoscopes), such as the Viewmaster®, where right and left images are totally isolated by a barrier, lens viewing mechanism, or both. Such devices, of course, are only suitable for one viewer at a time and are generally limited to viewing still images.

For groups of viewers, systems have been developed for isolating right and left images which are simultaneously projected onto a screen. Usually, the images are distinguishable, for example by color or polarization, and the viewer wears glasses having lenses capable of transmitting only one image to each eye. For example, images projected simultaneously in red and green may be filtered from each other using green and red filters. Alternatively, images polarized by 90° may be simultaneously projected and separated by correspondingly oriented polarized lenses. While such three-dimensional viewing systems are generally functional, many viewers object to having to wear glasses. However, the use of colored images for isolation generally limits the ability to project full color images, and the isolation provided by polarization of images is not complete.

It has long been an object to be able to present three-dimensional images to groups and audiences without the need for the individual viewers to wear glasses or other apparatus for isolating images. A number of systems have been proposed to such end. For example, simultaneously projected polarized images may be isolated by placing a pair of large polarizing screens between the audience and the images. The screens may then be shifted laterally in order to isolate the images from the right and left eyes, respectively. Although functional in theory, as a practical matter the polarizing screens are not sufficiently effective in isolating images to present a quality three-dimensional image.

For the above reasons, it would be desirable to provide improved systems for presenting three-dimensional images to groups of viewers, where the viewers do not need to wear image isolating devices, such as filter glasses.

2. Description of the Background Art

Stereoscopic imaging devices are described in U.S. Pat. Nos. 2,639,653; 2,974,562; 3,334,179; 3,439,972; 3,495,891; and 4,469,415; and in Japanese patent No. 60-37520. U.S. Pat. No. 2,974,562 describes a viewer which isolates polarized right and left images using a pair of transparent polarizing panels. By shifting the panels back and forth, view of a common screen can be alternately blocked for the left and right eyes. A similar concept is disclosed in U.S. Pat. No. 3,439,972, where two images are divided into a plurality of parallel vertical strips, and a vertical grating is used to isolate alternate strips from the right and left eyes respectively.

SUMMARY OF THE INVENTION

The present invention provides a system for displaying a stereoscopic image without the need for viewers to individually use filters, lenses, glasses, or other devices for isolating right and left images. The system is suitable for single viewers, or may be adapted for groups of viewers, and may be used to present either still images, or, more usually moving images.

The system comprises a screen for presenting right and left images which together define the stereoscopic image. The right and left images may be presented simultaneously at adjacent locations on the screen, or may be presented sequentially at the same location on the screen. In the first case, fixed louvers are positioned so that the right and left eyes of viewers within a predefined area are generally limited to the right and left images, respectively. In the other case, movable louvers are placed so that, in a first position, only the right eye can see the image on the screen and, in a second position, only the left eye can see the image on the screen. By synchronizing motion of the louvers and presentation of right and left images, a stereoscopic presentation can be maintained. For best results, the viewers should be located generally along a central line perpendicular to the plane of the screen. The degree of lateral divergence from the center line will depend on the precise geometry and size of the screen and louvers.

The images may be presented in any convenient fashion, typically being projected on a screen, either by film projection or by electron video projection. In the case of systems where separate right and left images are projected simultaneously, two separate screens will be utilized for projection. In the case where right and left images are projected sequentially on a single screen, the film can be arranged to project alternate series of each of the desired two images. Similarly, electronic video projection can be arranged to project the two images in the desired alternating sequence.

BRIEF DESCRIPTION OF THE DRAWINGS

FIG. 1 illustrates a first embodiment of the present invention where a louvered barrier is utilized to isolate separate right and left images.

FIG. 2 illustrates a second embodiment of the present invention where movable louvers are utilized to isolate images which are sequentially presented on a common screen.

DESCRIPTION OF THE SPECIFIC EMBODIMENTS

Referring to FIG. 1, a system for simultaneously viewing a pair of stereoscopic images comprises an enclosure 10, a pair of image screens 12 and 14 located within the enclosure, a central barrier panel 16 lying between the screens 12 and 14 and oriented perpendicularly to the plane of said co-planar image screens, a plurality of fixed isolation louvers 20 located on one face of the enclosure 10 and lying generally in a plane parallel to the plane of the screens 12 and 14. In order to view the images on the screens 12 and 14, a viewer will generally position him or herself along an imaginary center line CL generally aligned with the central barrier panel 16 of the enclosure 10. In this way, the right eye R of the viewer will have a generally unobstructed viewing path to see the image on the screen 12, while the left eye L of the viewer has a similarly unimpeded view path to see the image on screen 14. The louvers 20, however, prevent crossover viewing so that the image on the screen 14 is isolated from the right eye R, while the image on screen 12 is isolated from the left eye L.

The images on screens 12 and 14 may be still or moving, and in both cases will be stereoscopic images which define a three-dimensional image for the viewer. The method for presenting the images is not critical, and will generally comprise either a film projection system or an electronic video projection system. Such systems are well known in the art and need not be described further herein.

The isolation louvers 20 are intended to allow the viewer to step back from the enclosure 10 without the loss of isolation between the images on screens 12 and 14. As illustrated, louvers 20 are parallel to each other and aligned on a flat viewing plane 26. It is contemplated, however, that the louvers 20 may be arranged, in a non-parallel manner and aligned on a curved viewing plane to enhance the image isolation to prevent crossover vision. Conveniently, the louvers 20 may be oriented to lie parallel to the vision lines 22 from the desire eye. Such alignment, however, is not always necessary, and is effective only when it is known the likely distance at which the viewer will be positioned. The further back the viewer will sit, the less need there is to orient the louvers 20 in a non-parallel manner.

The size and spacing of the louvers 20 will depend primarily on the screen (image) sizes and the expected distance back from the enclosure at which the viewer(s) will be positioned. Typically, louvers will have a width in the range from about 0.5 to 5 inches, more usually from about 1 to 2 inches, and a spacing between adjacent louvers in the range from about 0.2 to 1.0 inches, more usually from about 0.5 to 0.7 inches. Viewers may then be positioned back from the enclosure 10 by a distance generally in the range from about 3 to 50 feet, more usually in the range from about 5 to 25 feet.

Referring now to FIG. 2, a system for allowing a viewer to observe sequential images projected on a common screen comprises a screen 30 and a plurality of movable louvers 32. The louvers 32 are positioned in front of the screen and are able to pivot about fixed points 34 which are generally located a distance d from the screen 30. Means (not illustrated) are provided for simultaneously moving the louvers 32 back and forth between a left viewing position shown in full line and a right viewing position shown in broken line. When the louvers 32 are all oriented in their left viewing position, the left eye L of the viewer is able to view the screen, while vision by the right eye R is blocked. Conversely, when the louvers 32 are in their right viewing position (broken line), the viewer is able to observe the screen through the right eye only, and vision from the left eye is blocked.

While FIG. 2 illustrates mechanical louvers, it will be appreciated that other systems for alternately blocking the right and left sight lines will also find use. For example, liquid crystal barriers (not illustrated) may be fixedly aligned in both the left and right louver positions illustrated in full and broken line positions in FIG. 2. Then, by alternately energizing the right and left liquid crystal barriers, operation of the viewing system may be effected in a manner analogous to that described above.

Three-dimensional images are thus obtained by sequentially presenting right and left stereoscopic views onto the screen 30 synchronously with the shifting of the louvers 32 between their right viewing and left viewing positions, respectively. The frequency of presenting the images should be greater than 10 images/second, usually being greater than 24 images/second, in order to maintain continuity of the images. It will be appreciated that both film projection systems and electronic video screens may be adapted to present the sequential images in a well known manner.

The dimensions of the movable louvers 32 will depend upon the size of the viewing screen 30 as well as the expected distance from the screen of the viewer. Typically, the louvers will have a width in the range from about 0.5 to 5 inches, more typically from about 1 to 2 inches, and will be spaced by a distance in the range from about 0.2 to 1.0 inches, more typically from about 0.5 to 0.7 inches. Viewers may then be positioned a distance back from the screen generally in the range from about 3 to 50 feet.

With the system of FIG. 2, it will be appreciated that viewers need not necessarily be located on or near the center line of the screen (not illustrated). Instead, by adjusting the particular angles through which the movable isolation louvers 32 are swept, viewers at various locations relative to the screen may be accomodated.

Although the foregoing invention has been described in some detail by way of illustration and example for purpose of clarity of understanding, it will be obvious that certain changes and modifications may be practiced within the scope of the appended claims.

What is claimed is:

1. A system for stereoscopic viewing, said system comprising:
   means for presenting a first image and a second image, said images differing by a predetermined stereoscopic parallax; and
   a plurality of louvers having a width in the range from about 0.5 to 5 inches for isolating the images from each other along predetermined sight lines corresponding to the positions of a viewer's eyes when the viewer is located within a predetermined area.

2. A system as in claim 1, wherein the images are presented simultaneously at two different locations and the louvers are fixed to isolate said locations so that each may be viewed by only one eye of the viewer.

3. A system as in claim 1, wherein the images are presented sequentially at a single location and the louvers are movable between a first position which isolates one eye from the image and a second position which isolates the other eye from the image.

4. A system as in claim 2, wherein the images are moving images.

5. A system as in claim 3, wherein two sequences of images are presented with the first sequence representing a moving scene taken from a first viewpoint and the second sequence representing the same moving scene taken from a second viewpoint, with the distance between the viewpoints representing the stereoscopic parallax.

6. A system as in claim 1, wherein the louvers are disposed vertically.

* * * * *